United States Patent [19]

Chiba et al.

[11] Patent Number: 5,447,561

[45] Date of Patent: Sep. 5, 1995

[54] PIGMENT-DISPERSED RESIN COMPOSITION

[75] Inventors: Naoki Chiba; Koichiro Sagawa; Takashi Zama, all of Kawasaki, Japan

[73] Assignee: Kenrich Petrochemicals, Inc., Bayonne, N.J.

[21] Appl. No.: 877,815

[22] Filed: May 4, 1992

[51] Int. Cl.$^6$ ............................................. C09D 11/02
[52] U.S. Cl. .................... 106/20 R; 106/436; 106/442; 106/447; 106/493; 106/20 C
[58] Field of Search .................... 106/447, 20 R, 410, 106/425, 437, 442, 449, 463, 476, 491, 493; 427/213–218

[56] References Cited

U.S. PATENT DOCUMENTS 3,660,134  5/1972  Morris et al. .................... 106/445
3,697,475  10/1972  Morris et al. .................... 106/445

FOREIGN PATENT DOCUMENTS 0243497  11/1987  European Pat. Off. .
0265839  5/1988  European Pat. Off. .
0359832  3/1990  European Pat. Off. .

OTHER PUBLICATIONS

Patent Abstracts of Japan. vol. 13, No. 510 (C–654), Nov. 15, 1989, & JP-A-12-03-470, Aug. 16, 1989, Hirohisa Senzaki, et al., "Electrically Conductive Composition".

*Primary Examiner*—Paul Lieberman
*Assistant Examiner*—Margaret Einsmann
*Attorney, Agent, or Firm*—Darby & Darby

[57] ABSTRACT

Herein is disclosed a pigment-dispersed resin composition comprising (a) a surface modified pigment in respect of which a surface modifying mixture consisting of a titanium oligomer and an organic acid ester is coated uniformly on the surface of the pigment particles and (b) a resin, usable, e.g., as an ingredient of a paint or a printing ink.

9 Claims, No Drawings

PIGMENT-DISPERSED RESIN COMPOSITION

BACKGROUND OF THE INVENTION

1. Field of the Invention

The present invention relates to a composition with excellent pigment dispersibility.

2. Discussion of the Background

The state of dispersion of pigment in paints and molded products greatly affects their mechanical properties and workability and is also closely associated with qualities such as color, luster, etc., of the coat or molded product. Pigment and organic matrix often differ in surface energy, and if, for instance, the pigment is an inorganic material having a large surface energy, it has poor compatibility with the organic matrix of small surface energy, giving rise to the problem of agglomeration of pigment particles when said pigment and organic matrix are kneaded.

A solution to this problem is apply a surface treatment to the pigment particles. Such a surface treatment is usually made by using higher fatty acid(s), silane coupling agent(s), titanium coupling agent(s) or the like. However, in the case of using higher fatty acid(s), since they do not directly react on the functional groups oriented in a pigment particle surface, no covalent bonds are formed. Further, there usually exists surface water on inorganic material particles and therefore the surface treating agent is orientated on the particle surface with an interposition of the water layer, so that said agent is prone to separate. In the case of the conventional coupling agents, it is said that generally they form covalent bonds with the surface functional groups, and in case a surface treated pigment is filled in a resin, the silane type improves strength of the resin while the titanium type enhances working characteristics of, and dispersibility in, the resin.

There is known a variety of titanate type surface treating agents, which are classified according to the functional groups bonded to the titanium and the forms of its polymer backbones. As the polymers, there are used, for instance, straight chain types such as proposed in Japanese Patent Application Kokai (Laid-Open) No. 61-118348. It is said that use of a polymer is advantageous over use of monomer.

These surface treating agents are already applied to pigments, but further improvement in dispersibility of pigments that leads to higher performance and higher quality of the products are required.

SUMMARY OF THE INVENTION

Accordingly, an object of the present invention is to offer a composition having very excellent dispersibility of pigments.

The present invention thus provides a pigment-dispersed resin composition which satisfies the above object of the invention and other objects which will become apparent from the description of the invention given hereinbelow.

In an aspect of the present invention, there is provided a pigment-dispersed resin composition comprising (a) a surface modified pigment in respect of which a surface modifying mixture consisting of a titanium oligomer and an organic acid ester is coated uniformly on the surface of the pigment particles and (b) a resin.

In another aspect of the present invention, there is provided a paint or a printing ink composition comprising (a) a surface modified pigment in respect of which a surface modifying mixture consisting of a titanium oligomer and an organic acid ester is coated uniformly on the surface of the pigment particles, (b) a resin and (c) a solvent.

DETAILED DESCRIPTION OF THE INVENTION

As a result of extensive studies on the subject, the present inventors have found that a composition blended with a surface modifying mixture consisting of a titanium oligomer and an organic acid ester has amazingly good pigment dispersibility, and these findings have led to attainment of the present invention.

Thus, the present invention provides a pigment-dispersed resin composition comprising (a) 1 part by weight of a surface modified pigment in respect of which a surface modifying mixture consisting of 1 part by weight of titanium oligomer and 0.5 to 50 parts by weight of an organic acid ester is coated uniformly on the surface of the pigment particles in an amount of 0.01 to 10% by weight based on the pigment, and (b) 0.15 to 9 parts by weight of a resin; and a paint or a printing ink composition comprising (a) 1 part by weight of a surface modified pigment in respect of which a surface modifying mixture consisting of 1 part by weight of a titanium oligomer and 0.5 to 50 parts by weight of an organic acid ester is coated uniformly on the surface of the pigment particles in an amount of 0.01 to 10% by weight based on the pigment, (b) 0.15 to 9 parts by weight of a resin, and (c) 0.15 to 45 parts by weight of a solvent.

The pigment used in the above compositions is preferably an organic pigment, carbon, a metal hydroxide, a carbonate, a sulfate, a chromate, a silicate, $Al_2O_3$, $TiO_2$ or $ZnO$.

The present invention will be described in further detail hereinbelow.

Regarding the titanium oligomers used in this invention, there can be employed basically all available types of titanium oligomers provided that they have an ester exchanging catalyst activity. As typical examples of such titanium oligomers, there can be mentioned titanium acylate polymers such as disclosed in Japanese Patent Application Kokai No. Hei 1-203470. Titanium oligomers having no hydrophobic groups like long-chain acylates and those having no hydrolyzable groups like alkoxyl groups are also usable.

Some examples of such titanium oligomers are shown below.

Linear type such as those represented by the following

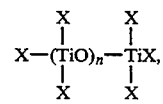

wherein n=2-about 40.

Ladder type such as those represented by the following structural formulae:

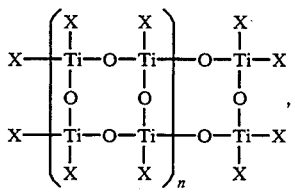

wherein n=2-about 40.
and

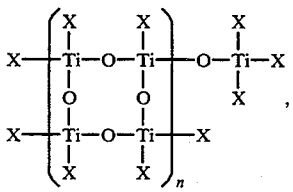

wherein n=2-about 40.
Cyclic type such as those represented by the following structural formula:

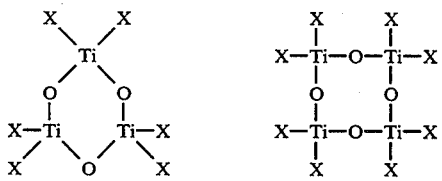

Highly condensed type such as those having the following partial structure A:

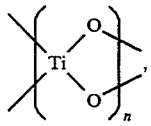

wherein n=2-about 40.
or the following partial structure B:

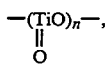

wherein n=2-about 40.

In the above formulae, X's represent independently OH, an alkoxyl group, an acylate group, a sulfonic acid residue, a phosphoric ester residue or a pyrophosphoric ester residue. Mixture of these titanium oligomers can be used as well.

The polymerization degree is somewhere between 2 and about 40, preferably between 5 and 30, for the reason that too low a polymerization degree gives a poor adsorption onto the filler while too high a polymerization degree gives a poor solubility in the resin or solvent.

The organic acid esters used in the present invention are preferably those in which the organic acid residue has hydrophobicity and the alcohol residue is of low molecular weight. Examples of the organic acid residues of said organic acid esters include fatty acids such as isostearic acid, stearic acid, palmitic acid, myristic acid, lauric acid, decanoic acid, octanoic acid, oleic acid, linoleic acid, and an alkanesulfonic acid having 5 to 20 carbon atoms, among which isostearic acid is preferred from the standpoint of providing hydrophobicity. Examples of the alcohol residues of the organic acid esters include an isopropyl, a propyl, an ethyl, a methyl, a butyl, an isobutyl, a t-butyl and the like alcohols, among which an isopropyl alcohol is preferred for the reasons of easy hydrolyzability and volatility after hydrolysis. The organic acid esters according to the present invention include further phosphoric acid esters and pyrophosphoric esters in respect of which at least one alcohol residue has the same carbon number as in the case of said fatty acids and still at least one alcohol residue has the same carbon number as in the case of said alcohols.

The preparation method of the surface modifying mixture used in this invention is not critical, but the following methods can be used favorably: an alkoxyl titanate such as tetraisopropyl titanate (TPT) is reacted with water or acetic acid to prepare a titanium oligomer, and the oligomer is mixed with 0.5 to 50 times by weight of an organic acid ester; and, an alkoxyl titanate and a higher organic acid are reacted to prepare in situ a mixture of an ester and a titanium oligomer as described in Japanese Patent Application Kokai No. Hei 2-18463. Too much ester reduces the catalytic action of the oligomer while too little ester fails to provide sufficient hydrophobicity.

As examples of the pigments, including the extender pigments, usable in this invention, the following can be mentioned: organic pigments such as Hansa Yellow, Toluidine Red, Lithos Red, phthalocyanine blue, phthalocyanine green, and quinacridone red, aluminum powder, bronze powder, red lead, cyanimide lead; carbon such as carbon black, acetylene black, vegetable black, graphite, ivory black, bone black, and pine black; metal hydroxides such as aluminum hydroxide, calcium hydroxide, and magnesium hydroxide; carbonates such as calcium carbonate, and magnesium carbonate; sulfates such as gypsum and barium sulfate; chromates such as chrome yellow, zinc yellow, ultramarine yellow, chrome green and zinc green; silicates such as clay, talc, silica powder and diatom earth; $Al_2O_3$, $TiO_2$, ZnO, ilmenite black, cadmium yellow, cyanamide lead, naples yellow, orpiment, vermilion, ultramarine red, cobalt violet, manganese violet, Prussian blue, cobalt blue, Guignet's green, green earth, patina, yellow iron oxide, ochre, sienna, amber, chalk, polishing powder, powder of baked earth, lead chromate, lead sulfate, and zinc dust.

As examples of the pigment surface modifying method, there are usable a dry method in which 0.01 to 10% by weight, preferably 0.5 to 5% by weight, of the surface modifying mixture is directly added to the pigment and uniformly dispersed by a Henschel mixer or other means, and a wet method in which the pigment is dipped in a solution of the surface modifying mixture and then the solvent is removed. Also effective for said purpose is an integral method in which the surface modifying mixture is added when the component materials are mixed together with a vehicle and/or various additives, as often practiced in the preparation of paints. No satisfactory effect can be obtained either when the amount of the surface modifying mixture added is too much or when it is too little. Thus, there can be obtained a surface modified pigment in respect of which a surface modifying mixture consisting of a titanium oligomer and an organic ester is coated uniformly on the surface of the pigment particles.

As the resin constituting an essential component of the composition of this invention, there can be used both thermoplastic and thermosetting resins, and in some cases elastomers may also be used. More specifically, such resins usable in this invention include natural resins such as rosin, shellac and gilsonite; phenol resins; butylurea; amino resins such as melamine resin; polyolefins such as polyethylene and polypropylene; chlorinated polyolefins such as chlorinated polyethylene and polyvinyl chloride; rubbers such as natural rubber, ethylene-propylene copolymer rubber, butyl rubber, butadine rubber, isoprene rubber, nitrile rubber and chloroprene rubber; polyamides such as nylon 12, nylon 46, nylon 11, nylon 6 and nylon 66; PPS (polyphenylenesulfide); polyvinyl acetate; ethylene-vinyl acetate copolymer; styrene-acryl copolymer; polyester resins such as alkyd resin; epoxy resins; polyurethane and a copolymer thereof with vinyl acetate or vinylidene chloride; polyacrylonitrile and its vinylidene chloride copolymer; polyvinyl butyral; cellulose resins such as nitrocellulose resin; petroleum resins; and fluorine resins. These binders may be used in combination.

In the composition of this invention, the resin such as mentioned above is blended in an amount of 0.15 to 9 parts by weight per 1 part by weight of the surface modified pigment for the reasons that too little an amount gives a poor processability while too large an amount gives a poor color development.

Blending of a surface modified pigment and a resin for preparing a pigment-dispersed resin composition of this invention is not subject to any specific restrictions; it may, for instance, be accomplished by kneading.

Splended dispersibility of pigment in resin in the composition of this invention can be accounted for by the following chemical structural characteristics.

In case a titanium oligomer has a hydrophobic group, the titanium compound is bonded to the surface of the pigment particles to make the surface hydrophobic. Covalent bond or hydrogen bond plays a key role in this phenomenon. If the surface of the pigment particles are not perfectly covered with the titanium oligomer by the above mechanism or if the titanium oligomer has no hydrophobic group, there takes place the following phenomenon. That is, in many cases, surface water is adsorbed on the hydrophilic particle surface of an inorganic substance through hydrogen bond, so that when a surface treatment is performed with a higher fatty acid or the like agent, since such an agent is orientated on the surface with the interposition of surface water, said agent tends to separate from the surface.

On the contrary, the surface modifying mixture used in the present invention has the action to chemically remove surface water. That is, the organic acid ester (the above-mentioned phosphoric or pyrophosphoric acid ester) is hydrolyzed into an organic acid (phosphoric or pyrophosphoric acid ester having at least one higher alcohol) and an alcohol (at least one lower alcohol) by the surface water in the presence of a titanium oligomer having the ester exchange catalyst function. This reaction removes the surface water which is impedimental to surface treatment, and further, the resulting organic acid is oriented directly at or closely to the site where surface water has been adsorbed on the surface of the pigment particles. In view of the adsorptive strength of the surface water, it is understood that adsorption of the organic acid onto the particle surface would be fairly strong.

Because of the above-said mechanism, the pigment used in the present invention should be the one which has a functional group capable of being hydrogen-bonded to an organic acid and also has surface water.

It is to be noted that a single use of an organic acid ester or a titanium oligomer having no hydrophobic groups in the molecule can not produce any noticeable surface modifying effect; it has been confirmed that the desired surface modifying effect can be derived for a joint use of the two compounds. In the above-said mechanism, it is essential to hydrolyze an organic acid ester with the surface water, and for these reasons, it should be noted that when a titanium compound having many hydrolyzable groups, for example, tetraisopropyl titanate (TPT) is used, no desired effect can be obtained since TPT consumes the surface water before the ester is hydrolyzed. In view of this, it is desirable to use a titanium oligomer which has been condensed to a high extent. It is supposed that the above-said reaction proceeds as the generated volatile alcohol is released out of the system to displace the equilibrium of the esterification reaction.

As described above, a pigment-dispersed resin composition of the present invention comprising a resin and a pigment having its surface modified with a surface modifying mixture consisting of a titanium oligomer and an organic acid ester is notably improved in pigment dispersibility in resin owing to bettered compatibility of the pigment with an organic matrix as a result of a decrease in surface energy of the pigment.

The pigment-dispersed resin composition of this invention can be used for various purposes such as molded resins, but it finds particularly useful application for preparation of paint or printing ink compositions.

For preparing a paint or printing ink composition, it is required to add a solvent to the base material comprising a surface modified pigment and a resin. The solvent used for the composition is not limited to any specific types except that it is essential that such solvent be capable of dissolving the resin used for the composition. The solvent may be used in the form of a mixture of a vegetable oil and a drying oil.

It is possible to add an ordinarily used additive or additives such as thickner, anti-settling agent, stain-proofing agent, antistatic agent, etc. within the limits not injurious to the properties of the composition.

Because of the pigment-dispersed type, the composition can also be applied to preparation of a two-component toner. In this case, there can be added, as fluidizing agent, colloidal silica, metal soap, nonionic surface active agent, silicone varnish or the like and other toner additives such as electric charge regulator.

The method per se of preparing a paint or printing ink composition is not critical, and any conventional method can be used, such as ball-milling.

The blending ratio of surface modified pigment to resin to solvent is preferably 1 to 0.15-9 to 0.15-45 in parts by weight for the reasons of viscosity characteristics and color development.

EXAMPLES

The present invention will be described more particularly below by showing some examples of the invention. It is to be understood, however, that these examples are in no way intended to be limitative on the scope of the invention but merely designed to show more definitely the advantageous features of the present invention.

Example 1 (Paint or printing ink composition)

10.2 g (170 mmol, 3.2 eq.) of acetic acid was added dropwise to 15 g (52.8 mmol) of tetraisopropyl titanate with stirring at room temperature, and then the mixture was heated with stirring for reaction at reflux temperature for 2.5 hours. As the reaction proceeded the reaction solution which had been initially transparent gradually became cloudy. The reaction by-products isopropyl alcohol and isopropyl acetate and the unreacted acetic acid were distilled away under reduced pressure, and the residual acetic acid was subjected to azeotropic distillation with toluene to obtain a white powder. This product had a melting point above 200° C. but was soluble in chloroform. A chloroform (490 parts by weight) solution of the titanium oligomer (1 part by weight) and isopropyl isostearate (9 parts by weight) was prepared as a surface modifying mixture solution.

150 parts by weight of this surface modifying mixture solution (3 parts by weight as surface modifying mixture) was added to 100 parts by weight of carbon black ("FW 200" produced by Degussa), and after stirring the mixture for 10 minutes, the chloroform was distilled away at 60° C. To 30 parts by weight of the resulting powdery product (surface modified pigment) was added 70 parts by weight of #4 varnish, and the mixture was kneaded with a homogenizer at 20,000 r.p.m. for 3 minutes.

The obtained pigment-dispersed resin composition was applied on a sheet of white paper and dried, and then its reflectance at 500 nm was measured.

The result is shown in Table 1.

Example 2 (Paint or printing ink composition)

To 10 g (35.2 mmol) of tetraisopropyl titanate, 32 g (112.7 mmol, 3.2 eq.) of isostearic acid was added dropwise slowly with stirring at room temperature, and then the mixture was heated with stirring for reaction at reflux temperature for 2.5 hours. The reaction by-product isopropyl alcohol was distilled away under reduced pressure to obtain a brown liquid. From this liquid, there was produced a surface modifying mixture comprising a 1:2 mixture of the obtained titanium oligomer and isopropyl isostearate. 10 parts by weight of said surface modifying mixture was dissolved in 490 parts by weight of chloroform to prepare a surface modifying mixture solution.

Thereafter, the same operations as in Example 1 were carried out except for the use of said surface modifying mixture solution in place of the surface modifying mixture solution used in Example 1, and the reflectance of the composition was measured in the same way as in Example 1.

The result is shown in Table 1.

Example 3 (Paint or printing ink composition)

To 10 g (4.16 mmol) of isopropyl titanate with an average condensation degree of 10 was added dropwise 1.3 g (4.58 mmol, 1.1 eq.) of isostearic acid. Then the mixture was stirred at 40° C. for reaction for 2 hours while removing the by-product isopropyl alcohol under reduced pressure to obtain a light brown liquid. A chloroform (490 parts by weight) solution of the obtained titanium oligomer (1 part by weight) and isopropyl stearate (9 parts by weight) was prepared, and this was used as surface modifying mixture solution.

Thereafter, the same operations as in Example 1 were performed except for the use of 5 parts by weight of said surface modifying mixture solution (0.1 part by weight calculated as surface modifying mixture) in place of the surface modifying mixture solution obtained in Example 1, and the reflectance of the composition was measured in the same way as in Example 1.

The result is shown in Table 1.

Example 4 (Paint or printing ink composition)

To 10 g (4.16 mmol) of isopropyl titanate with an average condensation degree of 10 was added dropwise 17.8g (62.7 mmol, 15.1 eq.) of isostearic acid. The mixture was stirred for reaction at 40° C. for 4.5 hours, and the reaction by-product isopropyl alcohol was removed under reduced pressure to obtain a light brown liquid. There was then prepared a hexane (490 parts by weight) solution of the obtained titanium oligomer (5 parts by weight) and isopropyl isostearate (5 parts by weight) as a surface modifying mixture solution.

Thereafter, the same operations as in Example 1 were repeated except for the use of 5 parts by weight of the prepared surface modifying mixture solution (0.1 part by weight as surface modifying mixture) in place of the surface modifying mixture solution obtained in Example 1, and the reflectance of the composition was determined in the same was as in Example 1.

The result is shown in Table 1.

Comparative Example 1

The procedure of Example 1 was followed except that non-treated carbon black was used instead of the surface treated carbon black, and the reflectance of the obtained composition was determined in the same way as in Example 1.

The result is shown in Table 1.

Comparative Example 2

A chloroform (490 parts by weight) solution of the surface modifying mixture obtained in Example 4 (10 parts by weight) was prepared. Thereafter, the same operations as in Example 1 were carried out except for the use of the solution in place of the surface modifying mixture solution prepared in Example 1, and the reflectance of the obtained composition was determined in the same way as in Example 1.

The result is shown in Table 1.

Comparative Example 3

10 parts by weight of the titanium oligomer obtained in Example 1 was dissolved in 490 parts by weight of chloroform, and the procedure of Example 1 was repeated except for the use of the solution in place of the surface modifying mixture solution obtained in Example 1, determining the reflectance of the obtained composition in the same way as in Example 1.

The result is shown in Table 1.

Comparative Example 4

The procedure of Example 1 was followed except that an ester solution prepared by dissolving 10 parts by weight of isopropyl isostearate in 490 parts by weight of chloroform was used in place of the surface modifying mixture solution obtained in Example 1, and the reflectance of the obtained composition was determined in the same way as in Example 1.

The result is shown in Table 1.

TABLE 1

Results of determination of reflectance of carbon black/varnish blended compositions

| | Reflectance (%) |
|---|---|
| Example 1 | 3.5 |
| Example 2 | 3.3 |
| Example 3 | 3.3 |
| Example 4 | 3.6 |
| Comp. Example 1 | 6.3 |
| Comp. Example 2 | 4.1 |
| Comp. Example 3 | 6.5 |
| Comp. Example 4 | 6.0 |

From the results of Examples 1-4 and Comparative Examples 1-4, it is to be understood that the paint compositions of the invention have a lower reflectance, which, in turns, means that they are improved in pigment dispersibility.

Example 5 (Paint composition)

150 parts by weight of the surface modifying mixture solution obtained in Example 1 (3 parts by weight calculated as surface modifying mixture) was added to 100 parts by weight of titanium dioxide ("R5N", ex Sakai Chemical Co., Ltd.), and after the stirring of the mixture for 10 minutes, chloroform was distilled away at 60° C. To 30 parts by weight of the resulting powder was added 70 parts by weight of #4 varnish, and the mixture was kneaded with a homogenizer at 20,000 r.p.m. for 3 minutes.

The obtained pigment-dispersed resin composition was coated on a sheet of black paper and dried. Consequently, the black color of the substrate was thoroughly hidden.

Example 6 (Paint composition)

A composition was prepared in the same way as in Example 5 except that the surface modifying mixture solution obtained in Example 2 was used in place of the one obtained in Example 1. When the composition was coated on a black paper, the black color of the substrate was thoroughly hidden.

Example 7 (Paint composition)

A composition was prepared by following the procedure of Example 5 except that the surface modifying mixture solution obtained in Example 3 was used in place of the one obtained in Example 1, and the composition was coated on a black paper and dried. Consequently, the black color of the substrate was entirely hidden.

Example 8 (Paint composition)

A composition was prepared according to the process of Example 5 by using the surface modifying mixture solution obtained in Example 4 in place of the surface modifying mixture solution obtained in Example 1, and the composition was coated on a black paper and dried. Consequently, the substrate black color was thoroughly hidden.

Comparative Example 5

A composition was prepared by following the procedure of Example 3 except for the use of non-treated titanium dioxide in place of the surface treated titanium dioxide. When the composition was coated on a black paper and dried, there were seen conglomerates and unevenness here and there due to poor dispersibility of titanium dioxide. Consequently, the black color of the substrate could not be concealed thoroughly.

Comparative Example 6

A composition was prepared by repeating the process of Example 3 except that the surface modifying mixture solution obtained in Comparative Example 2 was used in place of the one obtained in Example 1, and the composition was coated on a black paper and dried. although there were seen no conglomerates and unevenness, the black color of the substrate could not be concealed thoroughly.

From these results of Examples 5-8 and Comparative Examples 5 and 6, it can be learned that the paint compositions of the invention are improved in pigment dispersibility.

Example 9 (Paint composition)

To 100 parts by weight of phthalocyanine blue was added 150 parts by weight of the surface modifying mixture solution obtained in Example 1 (3 parts by weight as surface modifying mixture), and after stirring for 10 minutes, chloroform was distilled away at 60° C. To 30 parts by weight of the resultaning powder was added 70 parts by weight of #4 varnish, and the mixture was kneaded with a homogenizer at 20,000 r.p.m. for 3 minutes. When the obtained composition was coated on a white paper and dried, the pigment was dispersed evenly and the paper was colored uniformly.

Example 10 (Paint composition)

The procedure of Example 9 was followed except that the surface modifying mixture solution obtained in Example 2 was used in place of the one obtained in Example 1, and dispersibility of phthalocyanine blue was examined. The pigment was dispersed evenly and the paper was colored uniformly.

Example 11 (Paint composition)

The procedure of Example 9 was followed except that the surface modifying mixture solution obtained in Example 3 was used in place of the one obtained in Example 1, and dispersibility of phthalocyanine blue was examined. The pigment was dispersed evenly and the paper was colored uniformly.

Example 12 (Paint composition)

The procedure of Example 9 was followed except that the surface modifying mixture solution obtained in Example 4 was used in place of the one obtained in Example 1, and dispersibility of phthalocyanine blue was examined. The pigment was dispersed evenly and the paper was colored uniformly.

Comparative Example 7

A composition was prepared by following the procedure of Example 5 except for the use of non-treated phthalocyanine blue in place of the surface treated phthalocyanine blue, and the composition was coated on a white paper and dried. Dispersion of the pigment was bad and there was seen unevenness of irregularities here and there.

Comparative Example 8

A composition was prepared by following the procedure of Example 5 except that the surface modifying mixture solution obtained in Comparative Example 2 was used in place of the one obtained in Example 1, and the composition was coated on a white paper and dried. Although there was observed no conglomeration nor unevenness, the paper was colored in a somewhat dull blue color.

The results of Examples 9–12 and Comparative Examples 7 and 8 show that the paint compositions of the invention are improved in pigment dispersibility.

Example 13 (Pigment-dispersed resin composition)

100 parts by weight of the surface modifying mixture solution obtained in Example 1 (2 parts by weight as surface modifying mixture) was added to 100 parts by weight of aluminum hydroxide, and after the mixture had been stirred for 10 minutes, the chloroform was distilled away at 60° C.

To 100 parts by weight of the resultanting powder was added 100 parts by weight of polyethylene having a density of 0.922 g/cm$^3$ (ex Mitsui Petrochemical Co., Ltd.), and the mixture was kneaded by a two-roll mill at 140° C. and molded with a hot press to make a Dumbbell JIS #3 specimen.

This specimen was subjected to determination of elongation at a pulling rate of 200 mm/min with a Tensilon tensile testing machine.

The result is shown in Table 2.

Example 14 (Pigment-dispersed resin composition)

A Dumbbell specimen was prepared by following the same process as in Example 13 except for the use of 150 parts by weight of surface-treated aluminum hydroxide, and elongation of the specimen was determined in the same way as in Example 13.

The result is shown in Table 2.

Example 15 (Pigment-dispersed resin composition)

A Dumbbell specimen was prepared by following the process of Example 13 except for the use of 200 parts by weight of surface treated aluminum hydroxide, and elongation of the specimen were determined in the same way as in Example 13.

The result is shown in Table 2.

Example 16 (Pigment-dispersed resin composition)

The procedure of Example 13 was followed except for the use of the surface modifying mixture solution of Example 2 in place of that of Example 1 to prepare a Dumbbell specimen, and its elongation was determined in the same way as in Example 13.

The result is shown in Table 2.

Example 17 (Pigment-dispersed resin composition)

The procedure of Example 14 was repeated except for the use of the surface modifying mixture solution of Example 2 in place of that of Example 1 to prepare a Dumbbell speciment, and its elongation was determined in the same way as in Example 13.

The result is shown in Table 2.

Example 18 (Pigment-dispersed resin composition)

The procedure of Example 15 was followed except for the use of the surface modifying mixture solution of Example 2 in place of that of Example 1 to prepare a Dumbbell speciment, and its elongation was determined in the same way as in Example 13.

The result is shown in Table 2.

Comparative Example 9

The procedure of Example 13 was repeated except for the use of non-treated aluminum hydroxide to prepare a dumbbell specimen, and its elongation was determined in the same way as in Example 13.

The result is shown in Table 2.

Comparative Example 10

The procedure of Example 14 was followed except for the use of non-treated aluminum hydroxide to prepare a Dumbbell specimen, and its elongation was determined in the same way as in Example 13.

The result is shown in Table 2.

Comparative Example 11

The procedure of Example 15 was followed except for the use of non-treated aluminum hydroxide to prepare a Dumbbell specimen, and its elongation was determined in the same way as in Example 13.

The result is shown in Table 2.

Comparative Example 12

The procedure of Example 13 was followed except for the use of the surface modifying mixture solution obtained in Comparative Example 2 in place of the one obtained in Example 1 to prepare a Dumbbell specimen, and its elongation was determined in the same way as in Example 13.

The result is shown in Table 2.

Comparative Example 13

The procedure of Example 14 was followed except for the use of the surface modifying mixture solution obtained in Comparative Example 2 in place of the one obtained in Example 1 to prepare a Dumbbell specimen, and its elongation was determined in the same way as in Example 13.

The result is shown in Table 2.

Comparative Example 14

The procedure of Example 15 was followed except for the use of the surface modifying mixture solution of comparative Example 2 in place of that of Example 1 to prepare a Dumbbell specimen, and its elongation was determined in the same way as in Example 13.

The result is shown in Table 2.

Comparative Example 15

The procedure of Example 13 was followed except that the titanium polymer solution obtained in Comparative example 3 was used in place of the surface modifying mixture solution obtained in Example 1, to prepare a Dumbbell specimen, and its elongation was determined in the same way as in Example 13.

The result is shown in Table 2.

Comparative Example

The procedure of Example 13 was followed except for the use of the ester solution obtained in Comparative Example 4 in place of the surface modifying mixture solution obtained in Example 1 to prepare a Dumbbell specimen, and its elongation was determined in the same way as in Example 13.

The result is shown in Table 2.

TABLE 2

Elongation of aluminum hydroxide/
polyethyelen blended Dumbbell specimens

| | Elongation (%) |
|---|---|
| Example 13 | 547 |
| Example 14 | 401 |
| Example 15 | 300 |
| Example 16 | 530 |
| Example 17 | 405 |
| Example 18 | 289 |
| Comp. Example 9 | 27 |
| Comp. Example 10 | 15 |
| Comp. Example 11 | 8 |
| Comp. Example 12 | 188 |
| Comp. Example 13 | 259 |
| Comp. Example 14 | 242 |
| Comp. Example 15 | 11 |
| Comp. Example 16 | 20 |

From the results of Example 13–18 and Comparative Examples 9–16, it is understood that the pigment-dispersed resin compositions of the invention are improveed in pigment dispersibility, which, in turn, gives improved elongation.

Example 19 (Pigment-dispersed resin composition)

50 parts by weight of the surface modifying mixture solution (1 part by weight as surface modifying mixture) obtained in Example 3 was added to 100 parts by weight of calcium carbonate ("Silver-W" ex Shiraishi Calcium Co., Ltd.), and after stirring the mixture for 10 minutes, the chloroform was distilled away at 60° C.

50 parts by weight of the resultaning powder and 100 parts by weight of polypropylene ("MI-16", ex Chisso co., Ltd.), were mixed and the mixture was kneaded with a two-roll mill at 170° C. and molded into pellets.

The flow characteristics of the pellets were determined by a Koka-type flow tester at 230° C. under a load of 2.160 g.

The result is shown in Table 3.

Example 20 (Pigment-dispersed resin composition)

Pellets were made by following the procedure of Example 19 except for the use of 100 parts by weight of surface treated calcium carbonate, and their flow characteristics were determined in the same way as in Example 19.

The result is shown in Table 3.

Example 21 (Pigment-dispersed resin composition)

Pellets were made and their flow characteristics were determined in the same way as in Example 19 except for the use of 150 parts by weight of the surface modifying mixture solution obtained in Example 3.

The result is shown in Table 3.

Example 22 (Pigment-dispersed resin composition)

Pellets were made in accordance with Example 20 except for the use of 150 parts by weight of the surface modifying mixture solution obtained in Example 3, and the flow characteristics of the pellets were determined in the same way as in Example 19.

The result is shown in Table 3.

Example 23 (Pigment-dispersed resin composition)

Pellets were made and their flow characteristics were determined in accordance with Example 19 except that the surface modifying mixture solution obtained in Example 4 was used in place of the one obtained in Example 3.

The result is shown in Table 3.

Example 24 (Pigment-dispersed resin composition)

Pellets were made in accordance with Example 20 except that the surface modifying mixture solution obtained in Example 4 was used in place of the one obtained in Example 3, and the flow characteristics of the pellets were determined in the same way as in Example 19.

The result is shown in Table 3.

Example 25 (Pigment-dispersed resin composition)

Pellets were made in accordance with Example 21 except that the surface modifying mixture solution obtained in Example 4 was used in place of the one obtained in Example 3, and the flow characteristics of the pellets were determined in the same way as in Example 19.

The result is shown in Table 3.

Example 26 (Pigment-dispersed resin composition)

Pellets were made in accordance with Example 22 except for the use of the surface modifying mixture solution of Example 4 in place of that of Example 3, and the flow characteristics of the pellets were determined in the same way as in Example 19.

The result is shown in Table 3.

Comparative Example 17

Pellets were made and their flow characteristics were determined by following the procedure of Example 19 except for the use of non-treated calcium carbonate in place of the surface treated calcium carbonate.

The result is shown in Table 3.

Comparative Example 18

Pellets were made in accordance with Example 20 except for the use of non-treated calcium carbonate in place of the surface treated calcium carbonate, and the flow characteristics of the pellets were determined in the same way as in Example 19.

The result is shown in Table 3.

Comparative Example 19

Pellets were made and their flow characteristics were evaluated in accordance with Example 19 except that the surface modifying mixture solution obtained in comparative Example 2 was used in place of the one obtained in Example 3.

The result is shown in Table 3.

Comparative Example 20

Pellets were made-in accordance with Example 20 except for the use of the surface modifying mixture solution obtained in comparative Example 2 in place of the one obtained in Example 1, and the flow characteristics of the pellets were evaluated in the same way as in Example 19.

The result is shown in Table 3.

Comparative Example 21

The procedure of Example 21 was followed except for the use of the surface modifying mixture solution of Comparative Example 2 in place of that of Example 1 to make pellets, and their flow characteristics were evaluated.

The result is shown in Table 3.

Comparative Example 22

The procedure of Example 22 was followed except for the use of the surface modifying mixture solution of comparative Example 2 in place of that of Example 1 to make pellets, and their flow characteristics were evaluated.

The result is shown in Table 3.

Comparative Example 23

Pellets were made and their flow characteristics were evaluated in accordance with Example 19 except that the titanium polymer solution obtained in Comparative Example 3 was used in place of the one obtained in Example 3.

The result is shown in Table 3.

Comparative Example 24

Pellets were made and their flow characteristics were evaluated in accordance with Example 19 except that the ester solution obtained in comparative Example 4 was used in place of the surface modifying mixture solution obtained in Example 1.

The result is shown in Table 3.

TABLE 3

| Improvement in flow characteristics of calcium carbonate/ polypropylene blended pellets | |
|---|---|
| | Flow index g/10 min |
| Example 19 | 13.5 |
| Example 20 | 14.0 |
| Example 21 | 14.4 |
| Example 22 | 13.2 |
| Example 23 | 14.4 |
| Example 24 | 14.1 |
| Example 25 | 14.8 |
| Example 26 | 13.3 |
| Comp. Example 17 | 8.2 |
| Comp. Example 18 | 6.0 |
| Comp. Example 19 | 12.9 |
| Comp. Example 20 | 10.1 |
| Comp. Example 21 | 12.2 |
| Comp. Example 22 | 12.9 |
| Comp. Example 23 | 6.2 |
| Comp. Example 24 | 6.8 |

The results of Examples 19-26 and Comparative Examples 17-24 show that the pigment-dispersed resin compositions of the invention have a higher flow index attributable to the improved pigment dispersibility.

Effect of the Invention;

It has been established that the pigment-dispersed resin compositions comprising a surface modified pigment with a surface modifying mixture consisting of a titanium oligomer and an organic acid ester and a resin are improved in working properties such as tinting property, hiding power, tensile elongation and flow characteristics.

What is claimed is:

1. A pigment-dispersed resin composition, comprising
   (a) 1 part by weight of a surface modified pigment, prepared by a process consisting essentially of
      mixing 1 part by weight of titanium oligomer and 0.5 to 50 parts by weight of an organic acid ester to form a surface modifying mixture, wherein said organic acid ester has an organic acid residue and an alcohol residue, said organic acid residue being selected from the group consisting of isostearic acid, stearic acid, palmitic acid, myristic acid, lauric acid, decanoic acid, octanoic acid, oleic acid, linoleic acid, and alkanesulfonic acids having 5 to 20 carbon atoms, and said alcohol residue being selected from the group consisting of isopropyl alcohol, propyl alcohol, ethyl alcohol, methyl alcohol, butyl alcohol, isobutyl alcohol, and t-butyl alcohol, and
      uniformly coating the surface of pigment particles with said surface modifying mixture in an amount of 0.01 to 10% by weight based on the pigment; and
   (b) 0.15 to 9 parts by weight of a resin.

2. A pigment-dispersed resin composition according to claim 1, wherein the pigment is an organic pigment, carbon, a metal hydroxide, a carbonate, a sulfate, a chromate, a silicate, $Al_2O_3$, $TiO_2$ or ZnO.

3. The composition of claim 1, wherein said titanium oligomer is selected from the group consisting of the following structural formula:

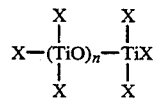

wherein n is from 2 to about 40, the following structural formulae:

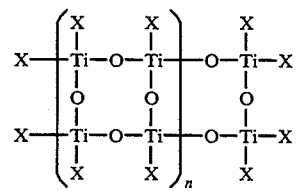

and

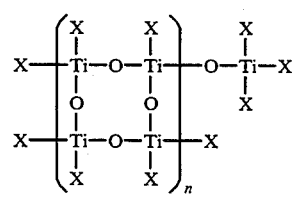

wherein n is from 1 to about 40, and the following structural formulae:

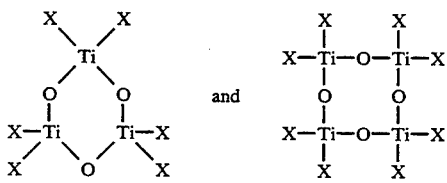 and 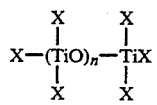

wherein n is from 2 to about 40, the following structural formulae:

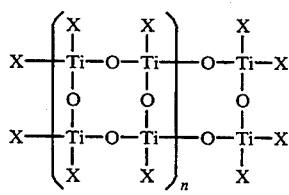

and

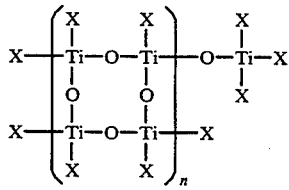

wherein n is from 1 to about 40, and the following structural formulae:

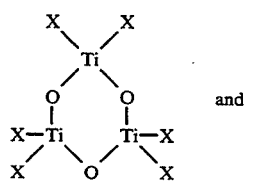 and 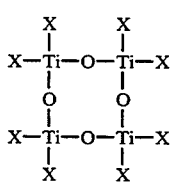

wherein X in the above formulae independently represents OH, and alkoxyl group, an acylate group, a sulfonic acid residue, a phosphoric acid residue or a pyrophosphoric ester residue, or a mixture thereof.

4. The composition of claim 3, wherein said titanium oligomer is selected from the group consisting of the following structural formulae:

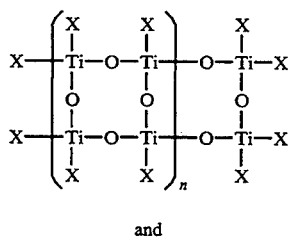

and

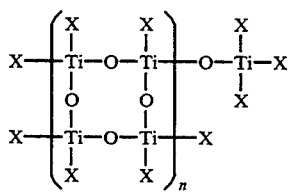

wherein n is between 5 and 30.

wherein X in the above formulae independently represents OH, and alkoxyl group, an acylate group, a sulfonic acid residue, a phosphoric acid residue or a pyrophosphoric ester residue, or a mixture thereof.

5. A paint or printing ink composition, comprising
(a) 1 part by weight of a surface modified pigment, prepared by a process consisting essentially of mixing 1 part by weight of titanium oligomer and 0.5 to 50 parts by weight of an organic acid ester to form a surface modifying mixture, wherein said organic acid ester has an organic acid residue and an alcohol residue, said organic acid residue being selected from the group consisting of isostearic acid, stearic acid, palmitic acid, myristic acid, lauric acid, decanoic acid, octanoic acid, oleic acid, linoleic acid, and alkanesulfonic acids having 5 to 20 carbon atoms, and said alcohol residue being selected from the group consisting of is isopropyl alcohol, propyl alcohol, ethyl alcohol, methyl alcohol, butyl alcohol, isobutyl alcohol, and t-butyl alcohol, and uniformly coating the surface of pigment particles with said surface modifying mixture in an amount of 0.01 to 10% by weight based on the pigment;
(b) 0.15 to 9 parts by weight of a resin; and
(c) 0.15 to 45 parts by weight of a solvent.

6. A paint or a printing ink composition according to claim 5, wherein the pigment is an organic pigment, carbon, a metal hydroxide, a carbonate, a sulfate, a chromate, a silicate, $Al_2O_3$, $TiO_2$ or ZnO.

7. The composition of claim 5, wherein said titanium oligomer is selected from the group consisting of the following structural formula:

8. The composition of claim 7, wherein said titanium oligomer is selected from the group consisting of the following structural formulae:

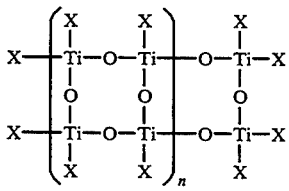

and

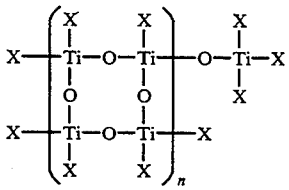

wherein n is between 5 and 30.

9. The composition of claim 5, wherein from 0.5-5% by weight of said surface modifying mixture is present.

* * * * *